(12) United States Patent
Geislinger et al.

(10) Patent No.: US 12,292,117 B2
(45) Date of Patent: May 6, 2025

(54) SEALING DEVICE

(71) Applicant: Geislinger Group GmbH, Hallwang (AT)

(72) Inventors: Matthias Geislinger, Hallwang (AT); Cornelius Geislinger, Hallwang (AT); Christof Sigle, Hallwang (AT)

(73) Assignee: Geislinger Group GmbH, Hallwang (AT)

( * ) Notice: Subject to any disclaimer, the term of this patent is extended or adjusted under 35 U.S.C. 154(b) by 0 days.

(21) Appl. No.: 18/430,100

(22) Filed: Feb. 1, 2024

(65) Prior Publication Data

US 2024/0263704 A1 Aug. 8, 2024

(30) Foreign Application Priority Data

Feb. 6, 2023 (DE) ............... 10 2023 102 813.8

(51) Int. Cl.
*F16J 15/3284* (2016.01)
*F16J 15/16* (2006.01)
*B63H 23/32* (2006.01)

(52) U.S. Cl.
CPC ......... *F16J 15/3284* (2013.01); *F16J 15/164* (2013.01); *B63H 2023/327* (2013.01)

(58) Field of Classification Search
CPC .... F16J 15/164; F16J 15/3224; F16J 15/3252; F16J 15/3284; F16J 15/441; B63H 2023/327

(Continued)

(56) References Cited

U.S. PATENT DOCUMENTS 3,154,309 A * 10/1964 Voitik .................... F16J 15/348
                                                        277/579
4,177,997 A    12/1979 Cartwright
(Continued)

FOREIGN PATENT DOCUMENTS

CN    103274029 A    9/2013
CN    109606535 A    4/2019
(Continued)

OTHER PUBLICATIONS

German Search Report and Written Opinion issued by the German Patent Office for German Patent Application No. DE 102023102813.8, dated Aug. 21, 2023, with English translation.

(Continued)

*Primary Examiner* — Nicholas L Foster
(74) *Attorney, Agent, or Firm* — Myers Wolin, LLC

(57) ABSTRACT

A sealing device for a shaft passing through a partition wall includes a housing having an opening for a shaft to pass through, and an annular groove. The sealing device also has a rigid ring arranged with axial and radial play in the annular groove of the housing and having a through-opening for the shaft to pass through, and an annular groove on an inner circumferential surface of said through-opening. The sealing device also has an elastic ring arranged in the annular groove of the rigid ring, and a sliding band for bearing against the shaft, which is arranged circumferentially on the inner circumferential surface of the through opening of the rigid ring and covers the annular groove of the rigid ring and the elastic ring arranged therein, the elastic ring being urged against the sliding band.

20 Claims, 3 Drawing Sheets

(58) Field of Classification Search
USPC .................................. 277/579, 580, 581, 589
See application file for complete search history.

(56) References Cited

U.S. PATENT DOCUMENTS

| | | | | |
|---|---|---|---|---|
| 4,403,779 A | * | 9/1983 | Wilkinson | F16J 15/164 |
| | | | | 277/355 |
| 4,449,719 A | * | 5/1984 | Radosay | B63H 23/321 |
| | | | | 251/1.1 |
| 4,898,394 A | * | 2/1990 | Voitik | F16J 15/32 |
| | | | | 277/925 |
| 7,828,299 B2 | * | 11/2010 | van Schoor | F16J 15/445 |
| | | | | 277/556 |
| 8,419,020 B2 | * | 4/2013 | van Schoor | F16J 15/164 |
| | | | | 277/553 |
| 8,608,172 B2 | * | 12/2013 | van Schoor | F16J 15/164 |
| | | | | 277/304 |
| 2008/0303218 A1 | * | 12/2008 | van Schoor | F16J 15/48 |
| | | | | 277/304 |
| 2010/0301566 A1 | * | 12/2010 | van Schoor | F16J 15/48 |
| | | | | 277/549 |
| 2011/0248450 A1 | * | 10/2011 | van Schoor | F16J 15/068 |
| | | | | 277/315 |
| 2021/0156480 A1 | * | 5/2021 | Romagnoli | F16J 15/46 |

FOREIGN PATENT DOCUMENTS

| | | |
|---|---|---|
| DE | 202013006128 U1 | 7/2013 |
| EP | 0092072 A1 | 10/1983 |
| GB | 2109875 A | 6/1983 |
| WO | 2009149448 A1 | 12/2009 |
| WO | 2011129870 A1 | 10/2011 |

OTHER PUBLICATIONS

Eagleburgmann, "Bulkhead Seal Espey WDK-BHS," Mar. 24, 2011, Eagle Burgmann Germany.

* cited by examiner

SEALING DEVICE

CROSS REFERENCE TO RELATED APPLICATIONS

This application takes priority from German Patent Application No. 10 2023 102 813.8, filed Feb. 6, 2023, the contents of which are incorporated by reference herein.

FIELD OF THE INVENTION

The invention relates to a sealing device for a shaft passing through a partition wall, the sealing device comprising a housing having an opening for a shaft to pass through, and an annular groove; a rigid ring arranged with axial and radial play in the annular groove of the housing and having a through-opening for the shaft to pass through, and an annular groove on an inner circumferential surface of said through-opening; and an elastic ring arranged in the annular groove of the rigid ring.

BACKGROUND

Such a sealing device may be used as an emergency system, for example on a shaft passage of a bulkhead of a ship, in order to prevent water from flowing along a drive shaft from one compartment of the ship to another in the event of water ingress. In normal operation, however, the sealing device is inactive and should affect the motion of the shaft as little as possible. In addition, it must be ensured that the sealing device is sufficiently wear-resistant and smooth-running so that it will work when required.

If water ingresses, it forces the rigid ring against a side wall of the annular groove of the housing and provides the desired sealing effect towards the housing at this point, while the elastic sealing ring seals the interface between the rigid ring and the shaft. In order for the rigid ring to come into contact with the side wall of the groove, it must be moved slightly axially on the shaft.

If the elastic ring is pressed too hard, the rigid ring cannot move sufficiently axially on the shaft to close the sealing location between the rigid ring and the housing. If the compression of the elastic ring is too low, the shaft can rotate relative to the elastic ring if the rigid ring is braked, for example, by running against a side wall of the annular groove of the housing. This can be caused by differences air pressure in the compartments. The deceleration of the elastic ring can lead to increased wear on the elastic ring, so that water may leak between the shaft and the rigid ring in the event of water ingress. Vibrations occurring on the shaft may accelerate premature wear of the elastic ring.

Sealing device as discussed above are known from CN 103274029 A and CN109606535 A. The technical problems inherent to such sealing devices are explained in WO 2011/129870 A1.

A further sealing device is disclosed in EP 0092072 A1.

Espey Burgmann GmbH offers a bulkhead seal with the designation WDK-BHS, which has two multi-part sealing rings made of PTFE, each of which is accommodated in an associated annular groove of a housing and is pressed onto the rotating shaft by means of an encircling spiral spring. However, strong radial and axial vibrations can lead to premature wear of the filigree sealing rings.

U.S. Pat. No. 4,177,997 A discloses a floating seal ring assembly including a carriage ring having an annular channel opening therein in which an annular seal element is supportingly received. The annular seal has a wear surface thereon slidably engaged with an outer surface on the shaft. Said outer surface is provided on a sleeve secured to the shaft, so that the carriage will move relative to the sleeve.

An object of the present invention is to remedy this situation. In particular, the disclosure aims at improving the robustness of a generic sealing device with regard to the occurrence of radial and axial vibrations on the shaft.

SUMMARY

This object may be solved by a sealing device comprising a housing having an opening for a shaft to pass through, and an annular groove; a rigid ring arranged with axial and radial play in the annular groove of the housing and having a through-opening for the shaft to pass through, and an annular groove on an inner circumferential surface of said through-opening; and an elastic ring arranged in the annular groove of the rigid ring; and a sliding band for bearing against the shaft, which is arranged circumferentially on the inner circumferential surface of the through opening of the rigid ring and covers the annular groove of the rigid ring and the elastic ring arranged therein, wherein the elastic ring is urged against the sliding band.

The solution according to this disclosure enables a robust design through the use of a solid rigid ring with very low wear at the same time. In particular, the sliding band prevents direct wear of the elastic ring. This in turn ensures that the rigid ring may move axially on the shaft when required so that the sealing device becomes operative.

At the same time, a high level of tightness is guaranteed between the rigid ring and the shaft in the radial direction.

The solution according to this disclosure thus avoids the problems inherent in the prior art described above in a simple and elegant manner.

For example, the sliding band can preferably be arranged in such a way that it protrudes radially inwards beyond the inner circumferential surface of the through opening of the rigid ring. This ensures a high level of tightness between the shaft and the rigid ring.

Furthermore, the rigid ring may have a receiving groove for receiving the sliding band on the inner circumferential surface of its through opening, whereby the depth of the receiving groove is smaller than the wall thickness of the sliding band. This prevents axial slippage of the sliding band. This is of particular interest if axial vibrations occur on the shaft.

It has been shown that a wall thickness of 1 to 3 mm may be advantageous for the sliding belt.

In a preferred embodiment, the sliding band may comprise or be formed by a film, wherein the material of the film is selected from a group comprising: polytetrafluoroethylene (PTFE), polyvinylidene fluoride (PVDF), polyethylene terephthalate (PETP), polyoxymethylene (POM) or polyether ether ketone (PEEK) and polyethylene with ultra-high molecular weight (PE-UHMW). This ensures particularly low friction with high wear resistance.

In a further preferred embodiment of the invention, the elastic ring may be made of neoprene. Such chloroprene rubbers are characterised by high resistance to weathering as well as good resistance to oils and greases. In addition, the material is self-extinguishing.

Instead of neoprene, however, other materials may be used for the elasticated ring depending on the application.

In a further preferred embodiment of the invention, the rigid ring may consist of a fibre-plastic composite material and/or metal. Since the rigid ring is connected to the shaft and sometimes rotates with the shaft, a particularly low component weight is desirable for this, so that fibre-plastic composites are preferably used.

According to a further preferred embodiment, the cross-section of the rigid ring may be configured in such a way that it tapers radially inwards towards the through opening. This creates a narrow annular contact area for the contact against a side wall of the annular groove of the housing, whereby a particularly high sealing effect is achieved.

According to a further preferred embodiment, part of the housing may be formed by a section of the partition wall through which the shaft is to pass. In this case, the housing is formed by the partition wall, e.g. a bulkhead wall, and a cover in such a way that one side wall of the annular groove of the housing is provided by the wall and the opposite side wall of the annular groove of the housing is provided by the cover. The width of the annular groove may be dimensioned in such a way that the rigid ring can be accommodated axially floating in it.

In a modification of this, the housing may as well be provided as a component independent of the partition wall and be secured individually to the partition wall. In this case, the housing has a housing ring and a cover, wherein one side wall of the annular groove of the housing is provided by the housing ring and the opposite side wall of the annular groove of the housing is provided by the cover, whereby the housing ring has fastening means for fixing the housing to a wall, in particular a bulkhead wall. Here too, the rigid ring is held in the annular groove of the housing in an axially floating manner.

Further, the present invention provides a sealing device for a shaft passing through a partition wall, the sealing device comprising: a housing having an opening for a shaft to pass through, and an annular groove; a rigid ring arranged with axial and radial play in the annular groove of the housing and having a through-opening for the shaft to pass through, and an annular groove on an inner circumferential surface of said through-opening; an elastic ring arranged in the annular groove of the rigid ring; and a sliding band for bearing against the shaft, which is arranged circumferentially on the inner circumferential surface of the through opening of the rigid ring and covers the annular groove of the rigid ring and the elastic ring arranged therein, the elastic ring being urged against the sliding band; wherein the sliding band is secured to the inner circumferential surface of the through opening of the rigid ring to thereby move with the rigid ring when the rigid ring is moved axially relative to the shaft.

BRIEF DESCRIPTION OF THE DRAWING

An embodiment example of the invention shown in the drawings is explained in more detail below. The drawings show in.

DETAILED DESCRIPTION OF THE PREFERRED EMBODIMENTS

Figure 1:
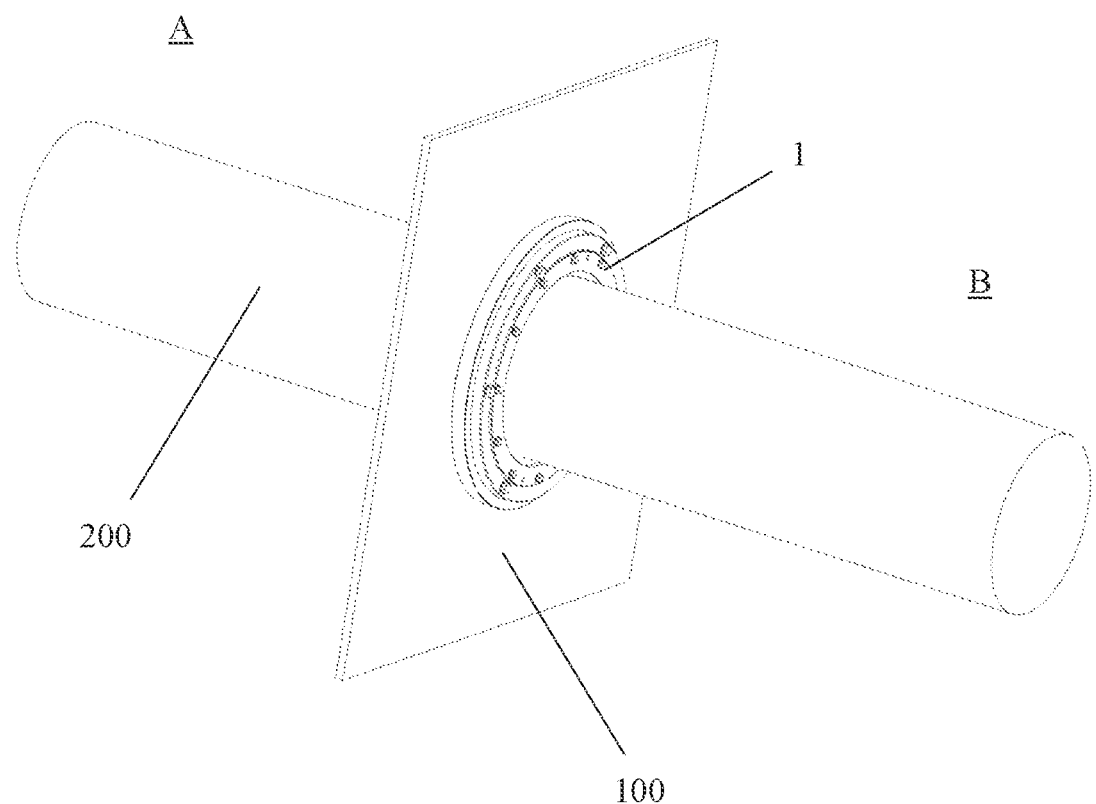
FIG. 1, a schematic view of an installation situation of a sealing device according to an embodiment of the invention on a partition, FIG. 2, a longitudinal sectional view of the sealing device of FIG. 1, and in FIG. 3, a cross-sectional view of the sealing device of FIG. 1.

The embodiment example shows a sealing device 1 for a shaft 200 passing through a partition wall 100. In FIG. 1, the partition wall 100 is shown as a bulkhead wall of a ship, which separates two ship compartments A and B from each other. Furthermore, the shaft 200 is shown to extend through the partition wall 100. This shaft 200 may for example, be a drive shaft of the ship.

The sealing device 1 is arranged between the partition wall 100 and the shaft 200. Its purpose is to prevent liquid, for example water, entering one of the chambers A or B from spilling into the other chamber B or A, or at least to slow it down sufficiently so that passengers and crew of the ship can be brought to safety or the latter may head for a harbour. In this case, liquid in contact with the sealing device 1 causes the sealing device 1 to seal. In normal operation, i.e. without liquid present, a sealing effect is not required.

The sealing device 1 has a housing 10 that is attached to the partition wall 100. In a variation of this, however, sections of the housing 10 may also be integrated into the partition wall 100.

Figure 2:
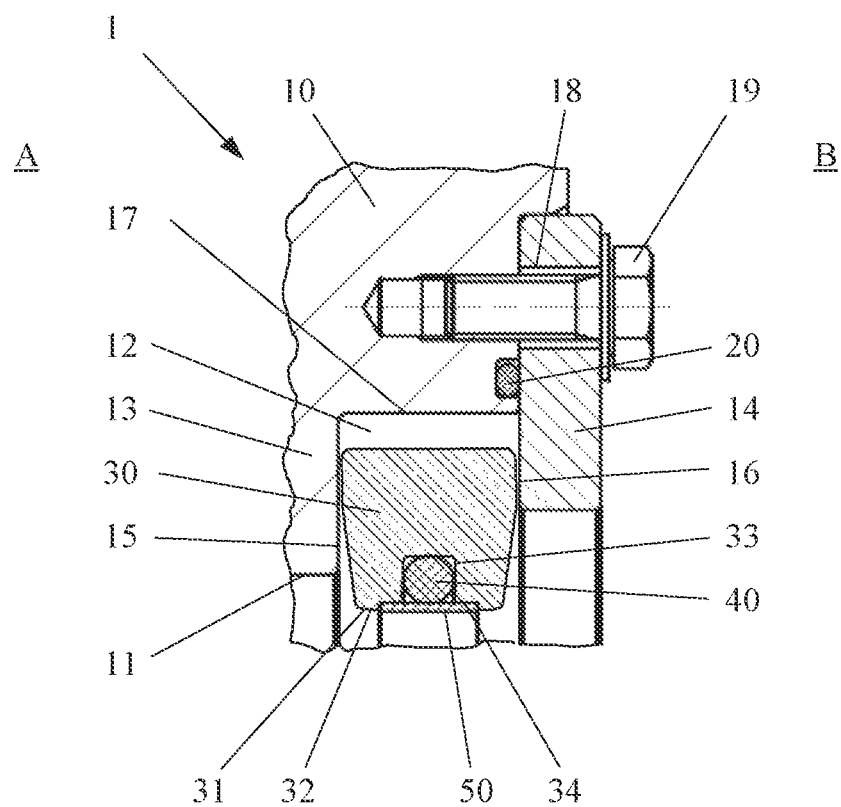

As shown in FIG. 2, the housing 10 has an opening 11 for the shaft 200 to pass through and also an annular groove 12. The annular groove 12 extends around the shaft 200 and is open towards the shaft 200.

In the embodiment example shown, the housing 10 has a housing ring 13 and a cover 14. A first side wall 15 of the annular groove 12 of the housing 10 is provided by the housing ring 13 and the opposite side wall 16 of the annular groove 12 of the housing 10 is provided by the cover 14. A bottom 17 of the annular groove 12 of the housing 10 may be formed either on the housing ring 13 or on the cover 14. It is also possible for the bottom 17 of the groove to be formed by wall sections on both the housing ring 13 and the cover 14.

The cover 14 is attached to the housing ring 13 and sealed against it. For its part, the housing ring 13 has fastening means 18, for example fastening holes, for fixing the housing 10 to the partition wall 100. In the embodiment example shown, the housing ring 13 is screwed to the wall 100 by means of threaded bolts 19, including a seal 20. However, it is also possible to attach the cover 14 directly to the partition wall 100 and, if necessary, also use it to secure the housing ring 13 to the partition wall 100.

In a modification of this, the housing ring 13 may also be integrated, i.e. in one piece, in the partition wall 100 in such a way that the first side wall 15 of the annular groove 12 of the housing 10 is provided by the partition wall 100 and the opposite side wall 16 of the annular groove 12 of the housing 10 is provided by the cover 14.

Furthermore, the sealing device 1 has a rigid ring 30, which is arranged with axial and radial play in the annular groove 12 of the housing 10. The axial play can be in the order of a few tenths of a millimetre and is not shown to scale in the attached figures. Preferably, the axial play to the side walls 15 and 16 of the annular groove 12 is 0.2 to 2.0 mm in total. A comparable clearance can be provided in the radial direction. However, since this radial play is of secondary relevance, the outer circumference of the rigid ring 30 may also have a greater distance from the bottom 17 of the annular groove 12, as can be seen qualitatively in FIG. 2.

The rigid ring 30 has a through hole 31 for the shaft 200 to pass through. It also has an annular groove 33 on an inner circumferential surface 32 of its through opening 31.

The rigid ring 30 is preferably made of a fibre-plastic composite material in order to keep its component weight low. However, it may also be made of metal or a combination of metal and fibre-plastic composite material.

Furthermore, the rigid ring 30 may be designed with a cross-section that tapers radially inwards towards the through opening 31. If necessary, this ensures a good sealing effect against the relevant side wall 15, 16 of the annular groove 12 of the housing 10 when liquid is in axial contact with the rigid ring 30. The cross-section of the rigid ring 30 may be tapered in a radially inward direction, as can be seen in FIG. 2. However, other cross-sectional shapes that taper radially inwards are also possible.

An elastic ring 40 is arranged in the annular groove 33 of the rigid ring 30. In the present case, the terms "rigid" and "elastic" are to be understood as being qualitatively distinct from one another, to the effect that the elastic ring 40 has a significantly higher elasticity than the rigid ring 30. The elastic ring 40 is softer than the rigid ring 30.

The two rings 30, 40 form a kind of double sealing ring with a soft shaft seal via the ring 40 and a harder retaining sealing ring in the form of the ring 30, which accommodates the soft shaft seal and seals it against the housing 10.

The elastic ring 40, which is preferably designed as an O-ring, may have a round cross-section. However, other cross-sectional shapes are also possible.

Preferably, the elastic ring 40 is made of neoprene or a comparable rubber. However, other elastically compressible materials may also be used for the elastic ring 40.

Furthermore, the sealing device 1 comprises a sliding band 50 for bearing against the shaft 200.

The surface of this sliding band 50 facing the shaft 200 is preferably made of a friction-reducing material.

It is arranged circumferentially on the inner circumferential surface 32 of the through-opening 31 of the rigid ring 30 and simultaneously covers the annular groove 33 of the rigid ring 30 and the elastic ring 40 arranged in said annular groove 33 on the side facing the shaft 200.

The sliding band 50 is secured to the inner circumferential surface 32 of the through opening 31 of the rigid ring 30 to thereby move together with the rigid ring 30 when the rigid ring 30 is moved axially relative to the shaft 200.

The annular groove 33 and the elastic ring 40 are preferably matched to each other in such a way that the elastic ring 40 is pressed against the sliding band 50. In other words, the elastic ring 40, which is supported radially outwards in the annular groove 33 of the rigid ring 30, presses against the radial outer wall of the sliding band 50.

When the sealing device 1 is installed, the elastic ring 40 urges the sliding band 50 against the outer circumference of the shaft 200 and thus elastically seals the gap between the rigid ring 30 and the shaft 200 against the passage of liquid. This allows vibrations of the shaft 200 in the radial direction to be compensated for without impairing the sealing effect.

The sliding band 50 seals the rigid ring 30 against the shaft 200 in the area of the annular groove 33 and the elastic ring 40. The elastic ring 40 acts as a seal between the sliding band 50 and the annular groove 33.

In addition, the sliding band 50 ensures that the rigid ring 30 may move smoothly in axial direction on the shaft 200 when being urged by liquid, so that the rigid ring 30 sealingly engages with one of the side walls 15, 16 of the annular groove 12 of the housing 10 when required due to the presence of liquid.

In addition, the sliding band 50 prevents premature wear of the elastic ring 40 by avoiding friction between the elastic ring 40 and the shaft 200. This considerably improves the wear resistance of the sealing device 1 and thus massively reduces the risk of it becoming ineffective due to wear.

The sealing device 1 therefore combines a high level of robustness with high wear resistance and a long service life, so that maintenance intervals can be significantly extended.

The sliding band 50 may for example, comprise a film or consist of such a film. The material of the film is preferably selected from a group comprising: polytetrafluoroethylene (PTFE), polyvinylidene fluoride (PVDF), polyethylene terephthalate (PETP), polyoxymethylene (POM) or polyether ether ketone (PEEK) and polyethylene with ultra-high molecular weight (PE-UHMW).

The sliding band 50 may be raised radially inwards above the inner circumferential surface 32 of the through opening 31 of the rigid ring 30.

Furthermore, the rigid ring 30 may have a receiving groove 34 for receiving the sliding band 50 on the inner circumferential surface 32 of its through opening 31. The depth of the receiving groove 34 is smaller than the wall thickness of the sliding band 50.

Preferably, the wall thickness of the sliding band 50 is 1 to 3 mm. The width of the sliding band 50 is a multiple of the wall thickness. It is preferably in the range of 10 to 30 mm.

Figure 3:
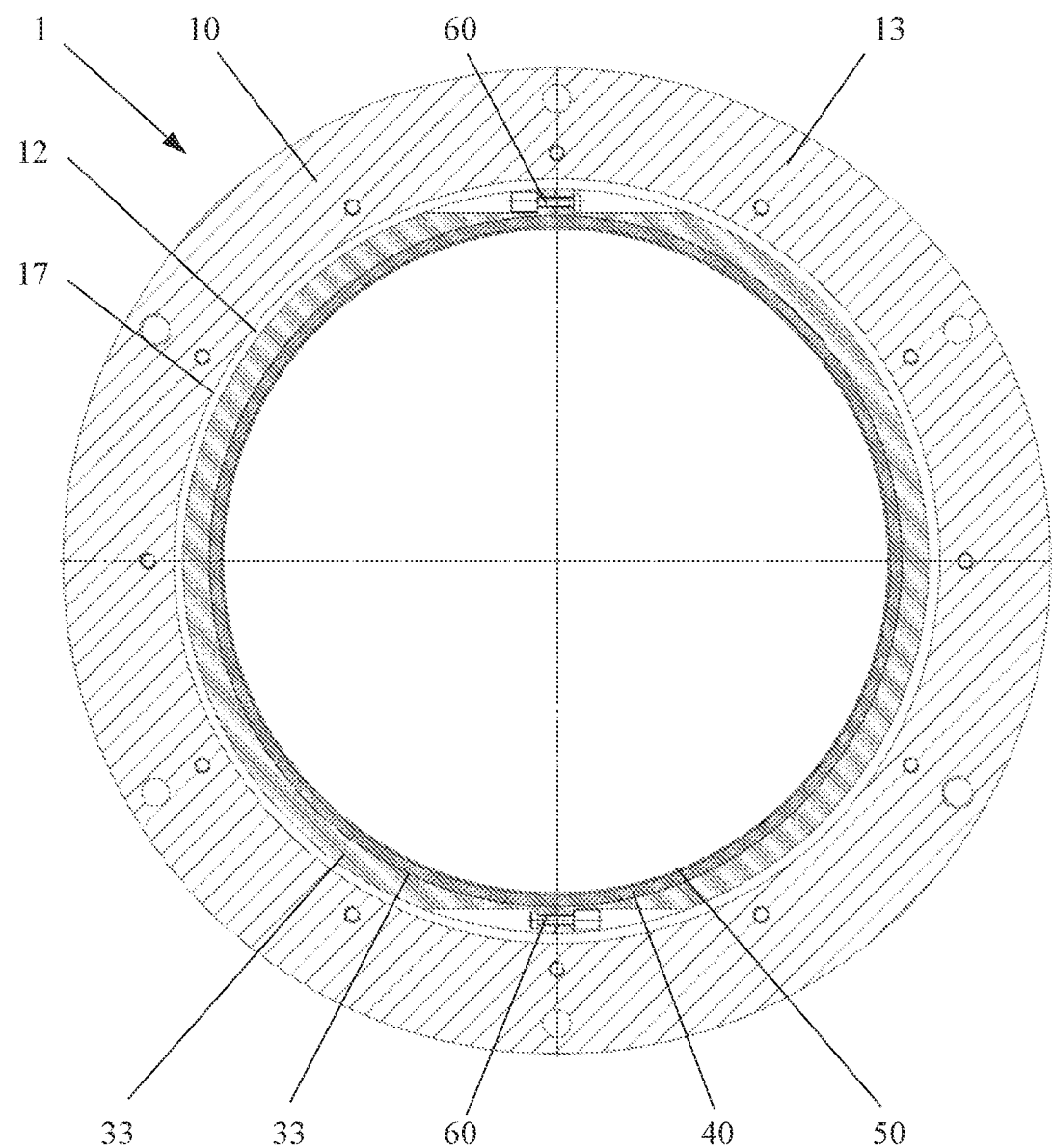

To facilitate assembly with the shaft 200 already installed, the housing 10, the seal 20, the rigid ring 30 and preferably also the elastic ring 40 may be divided into two or more segments in the circumferential direction, which are connected to each other during assembly. FIG. 3 shows an example of a subdivision of the rigid ring 30 in two segments, which are connected to each other by means of threaded bolts 60.

In normal operation of the sealing device 1, the rigid ring 30 is slightly biased radially against the shaft 200 via the elastic ring 40, so that the rigid ring 30 rotates with the shaft 200. There is a sealing effect between the rigid ring 30 and the shaft 200. Due to its axial and radial play in the annular groove 12, the two compartments A and B are connected to each other via the corresponding gaps between the rigid ring 30 and the annular groove 12, so that in principle liquid and gas transfer is possible. If the rigid ring 30 runs against one of the side walls 15, 16 of the annular space 12 of the housing 10 during normal operation, for example as a result of axial vibrations of the shaft 200, the rigid ring 30 is decelerated by the housing 10. The resulting relative movement to the shaft 200 occurs primarily between the sliding band 50 and the shaft 200, which prevents wear on the elastic ring 40.

If liquid enters one of the compartments A or B and accumulates on the rigid ring 30, the rigid ring 30 is pushed against one of the side walls 15, 16 of the anflular groove 12 of the housing 10 by the liquid, because the liquid cannot escape quickly due to the throttling effect of the gaps. As a result, the rigid ring 30 seals against the housing 10 so that a passage of a substantial amount liquid is prevented. The shaft 200 may continue to rotate in order to maintain operation, for example maneuverability of a ship.

The sealing device 1 has been explained in more detail above in connection with a bulkhead on a ship and its drive shaft. However, it can also be used in other application environments in which a high degree of robustness and wear resistance is required on a floating shaft seal. In this respect, the partition wall described above is not to be understood as being limited to a bulkhead and the shaft described above is not to be understood as being limited to a drive shaft.

The invention has been explained in more detail above with reference to an example embodiment and further variations, which serve to demonstrate the feasibility of the invention. However, it is not limited to the embodiment example and the further variations, but includes all embodiments defined by the patent claims. In particular, the features explained above can be combined with each other even if this is not expressly mentioned, as long as this is technically possible. Such combinations and sub-combinations are hereby included in the present disclosure and are not described again separately merely for reasons of compact presentation.

What is claimed is:

1. A sealing device (1) for a shaft passing through a partition wall (100), the sealing device (1) comprising:
   a housing (10) having an opening (11) for a shaft (200) to pass through, and an annular groove (12);
   a rigid ring (30) arranged with axial and radial play in the annular groove (12) of the housing (10) and having a through-opening (31) for the shaft (200) to pass through, and an annular groove (33) on an inner circumferential surface (32) of said through-opening (31);
   an elastic ring (40) arranged in the annular groove (33) of the rigid ring (30); and
   a sliding band (50) for bearing against the shaft (200), which is arranged circumferentially on the inner circumferential surface (32) of the through opening (31) of the rigid ring (30) and covers the annular groove (33) of the rigid ring (30) and the elastic ring (40) arranged therein, the elastic ring (40) being urged against the sliding band (50);
   wherein the sliding band (50) protrudes radially inwards beyond the inner circumferential surface (32) of the through opening (31) of the rigid ring (30).

2. The sealing device (1) of claim 1, wherein the rigid ring (30) has a receiving groove (34) for receiving the sliding band (50) on the inner circumferential surface (32) of its through opening (31), wherein the depth of the receiving groove (34) is smaller than the wall thickness of the sliding band (50).

3. The sealing device (1) of claim 1, wherein the sliding band (50) has a wall thickness of 1 to 3 mm.

4. The sealing device (1) of claim 1, wherein the sliding band (50) comprises a film, wherein the material of the film is selected from a group comprising: polytetrafluoroethylene (PTFE), polyvinylidene fluoride (PVDF), polyethylene terephthalate (PETP), polyoxymethylene (POM), polyether ether ketone (PEEK), and polyethylene with ultra-high molecular weight (PE-UHMW).

5. The sealing device (1) of claim 1, wherein the elastic ring (40) is made of neoprene.

6. The sealing device (1) of claim 1, wherein the rigid ring (30) consists of a fibre-plastic composite material and/or metal.

7. The sealing device (1) of claim 1, wherein the cross-section of the rigid ring (30) tapers radially inwards towards the through-opening (31).

8. The sealing device (1) of claim 1, wherein the housing (10) is formed by a partition wall (100) and a cover (14) in such a way that one side wall (15) of the annular groove (12) of the housing (10) is provided by said partition wall (100) and the opposite side wall (16) of the annular groove (12) of the housing (10) is provided by the cover (14).

9. The sealing device (1) of claim 1, wherein the housing (10) has a housing ring (13) and a cover (14), wherein one side wall (15) of the annular groove (12) of the housing (10) is provided by the housing ring (13) and the opposite side wall (16) of the annular groove (12) of the housing (10) is provided by the cover (14), and the housing ring (13) has fastening means (18) for fixing the housing (10) to a partition wall (100).

10. A sealing device (1) for a shaft passing through a partition wall (100), the sealing device (1) comprising:
    a housing (10) having an opening (11) for a shaft (200) to pass through, and an annular groove (12);
    a rigid ring (30) arranged with axial and radial play in the annular groove (12) of the housing (10) and having a through-opening (31) for the shaft (200) to pass through, and an annular groove (33) on an inner circumferential surface (32) of said through-opening (31);
    an elastic ring (40) arranged in the annular groove (33) of the rigid ring (30); and
    a sliding band (50) for bearing against the shaft (200), which is arranged circumferentially on the inner circumferential surface (32) of the through opening (31) of the rigid ring (30) and covers the annular groove (33) of the rigid ring (30) and the elastic ring (40) arranged therein, the elastic ring (40) being urged against the sliding band (50);
    wherein the sliding band (50) is secured to the inner circumferential surface (32) of the through opening (31) of the rigid ring (30) to thereby move together with the rigid ring (30) when the rigid ring (30) is moved axially relative to the shaft (200).

11. The sealing device (1) of claim 10, wherein the rigid ring (30) has a receiving groove (34) for receiving the sliding band (50) on the inner circumferential surface (32) of its through opening (31), wherein the depth of the receiving groove (34) is smaller than the wall thickness of the sliding band (50).

12. The sealing device (1) of claim 10, wherein the sliding band (50) has a wall thickness of 1 to 3 mm.

13. The sealing device (1) of claim 10, wherein the sliding band (50) comprises a film, wherein the material of the film is selected from a group comprising: polytetrafluoroethylene (PTFE), polyvinylidene fluoride (PVDF), polyethylene terephthalate (PETP), polyoxymethylene (POM), polyether ether ketone (PEEK), and polyethylene with ultra-high molecular weight (PE-UHMW).

14. The sealing device (1) of claim 10, wherein the elastic ring (40) is made of neoprene.

15. The sealing device (1) of claim 10, wherein the rigid ring (30) consists of a fibre-plastic composite material and/or metal.

16. The sealing device (1) of claim 10, wherein the cross-section of the rigid ring (30) tapers radially inwards towards the through-opening (31).

17. The sealing device (1) of claim 10, wherein the housing (10) is formed by a partition wall (100) and a cover (14) in such a way that one side wall (15) of the annular groove (12) of the housing (10) is provided by said partition wall (100) and the opposite side wall (16) of the annular groove (12) of the housing (10) is provided by the cover (14).

18. The sealing device (1) of claim 10, wherein the housing (10) has a housing ring (13) and a cover (14), wherein one side wall (15) of the annular groove (12) of the housing (10) is provided by the housing ring (13) and the opposite side wall (16) of the annular groove (12) of the housing (10) is provided by the cover (14), and the housing ring (13) has fastening means (18) for fixing the housing (10) to a partition wall (100).

19. A sealing device (1) for a shaft passing through a partition wall (100), the sealing device (1) comprising:
    a housing (10) having an opening (11) for a shaft (200) to pass through, and an annular groove (12);
    a rigid ring (30) arranged with axial and radial play in the annular groove (12) of the housing (10) and having a through-opening (31) for the shaft (200) to pass through, and an annular groove (33) on an inner circumferential surface (32) of said through-opening (31);

an elastic ring (40) arranged in the annular groove (33) of the rigid ring (30); and a sliding band (50) for bearing against the shaft (200), which is arranged circumferentially on the inner circumferential surface (32) of the through opening (31) of the rigid ring (30) and covers the annular groove (33) of the rigid ring (30) and the elastic ring (40) arranged therein, the elastic ring (40) being urged against the sliding band (50);

wherein the sliding band (50) is secured to the inner circumferential surface (32) of the through opening (31) of the rigid ring (30) to thereby move together with the rigid ring (30) when the rigid ring (30) is moved axially relative to the shaft (200);

wherein the sliding band (50) comprises a film, wherein the material of the film is selected from a group comprising: polytetrafluoroethylene (PTFE), polyvinylidene fluoride (PVDF), polyethylene terephthalate (PETP), polyoxymethylene (POM), polyether ether ketone (PEEK), and polyethylene with ultra-high molecular weight (PE-UHMW);

wherein the elastic ring (40) is made of neoprene; and wherein the rigid ring (30) consists of a fibre-plastic composite material and/or metal.

20. The sealing device (1) of claim 19, wherein the housing (10) has a housing ring (13) and a cover (14), wherein one side wall (15) of the annular groove (12) of the housing (10) is provided by the housing ring (13) and the opposite side wall (16) of the annular groove (12) of the housing (10) is provided by the cover (14), and the housing ring (13) has fastening means (18) for fixing the housing (10) to a partition wall (100).

* * * * *